United States Patent [19]

Stade

[11] Patent Number: 4,534,652
[45] Date of Patent: Aug. 13, 1985

[54] MULTISHAFTED, CONTINUOUS MIXING AND KNEADING OF PLASTIFIABLE MATERIALS

[75] Inventor: Kurt Stade, Liestal, Switzerland

[73] Assignee: AUTOMATIK Apparate-Maschinenbau H. Hench GmbH, Grossostheim, Fed. Rep. of Germany

[21] Appl. No.: 468,495

[22] Filed: Feb. 22, 1983

[30] Foreign Application Priority Data

Feb. 22, 1982 [DE] Fed. Rep. of Germany ....... 3206325

[51] Int. Cl.$^3$ .............................................. B29B 1/10
[52] U.S. Cl. ........................................ 366/85; 366/88; 366/301
[58] Field of Search ........................ 366/69, 76, 79, 81, 366/82, 83, 84, 85, 90, 96, 97, 98, 99, 318, 319, 324, 91, 301, 325; 425/207, 208, 209

[56] References Cited

U.S. PATENT DOCUMENTS

| 2,559,418 | 7/1951 | Ford | 366/301 |
| 3,608,868 | 9/1971 | Koch | 366/85 |
| 3,825,236 | 7/1974 | Mussmann et al. | 366/76 |
| 4,110,884 | 8/1978 | Nakamura | 366/319 |
| 4,131,371 | 12/1978 | Tynan | 366/301 |
| 4,289,409 | 9/1981 | Brand | 366/83 |

FOREIGN PATENT DOCUMENTS

| EP87699 | 5/1983 | European Pat. Off. . |
| 1985743 | 8/1965 | Fed. Rep. of Germany . |
| 2236902 | 2/1974 | Fed. Rep. of Germany . |
| 2513577 | 10/1975 | Fed. Rep. of Germany . |
| 2614136 | 10/1976 | Fed. Rep. of Germany . |
| 2550969 | 5/1977 | Fed. Rep. of Germany . |

Primary Examiner—Robert W. Jenkins
Attorney, Agent, or Firm—George E. Kersey

[57] ABSTRACT

Multishafted, continuous mixing and kneading of plastifiable compounds using mutually engaging worm elements which rotate in the same sense, at a constant axial separation. Along the direction of advance, the worm elements have successive zones with different numbers of threads. Each zone with the smaller number of threads follows a zone with a larger number of threads. The worm elements mesh with one another in successive zones so that the worm element of one zone has a self-cleaning action upon one another, and the zone with the smaller number of threads has a housing with a larger interior bore and larger corresponding worms than the zone with the larger number of threads, so that, in the zone with the smaller number of threads, the free cross-section is larger than in the preceding zone. Both zones have fill openings that can be charged independently of one another.

20 Claims, 3 Drawing Figures

MULTISHAFTED, CONTINUOUS MIXING AND KNEADING OF PLASTIFIABLE MATERIALS

BACKGROUND OF THE INVENTION

This invention relates to the multishafted, continuous mixing and kneading of plastifiable materials and, more particularly, to the plastification of such materials using mutually engaging worm elements which rotate in the same sense with a constant axial separation. In their direction of advance, the worm elements are in successive zones with different numbers of threads, with a zone having a smaller number of threads following a zone with a larger number of threads.

A machine for such mixing and kneading is disclosed in German Offenlegungsschrift No. 2,236,902. In this machine, a single-threaded zone with a trapezoidal profile follows a double-threaded zone with a self-cleaning profile. Because of the trapezoidal profile, the single-threaded zone cannot act in a self-cleaning fashion. The result is a machine with a forward zone where mixing essentially takes place, accompanied by considerable shear. In the following zone, with a smaller number of threads, large shear forces are avoided and a high pressure build-up is achieved to permit suitable extrusion.

Accordingly, it is an object of the invention to facilitate the continuous mixing of plastifiable materials. A related object is to facilitate the simultaneous mixing and kneading of such materials.

Another object of the invention is to eliminate the need for using a trapezoidal profile in a continuous mixing and kneading operation. A related object is to overcome the disadvantages associated with the use of trapezoidal profiles, particularly the inability to effectuate self-cleaning in the operation of such a profile.

Still another object of the invention is to increase the facility with which materials being processed can be supplemented by additives. A related object is to provide for the addition of additives in a way that achieves homogeneity of plastifiable materials and their additives.

SUMMARY OF THE INVENTION

In accomplishing the foregoing and related objects, the invention provides for the mixing and kneading of materials using worm elements in successive zones that engage one another to provide a self-cleaning action. The elements in the different zones have different numbers of threads. The zone with the smaller number of threads has a larger interior boring in its housing, and larger worm elements, than the zone with the larger number of threads. In the zone with the smaller number of threads, there is a larger free cross-section than in the preceding zone, desirably by a factor of about 1.5. In addition, the two zones have fill openings which can be charged independently of one another.

In accordance with one aspect of the invention, the material that is being processed is subjected to intensive mixing in the zone with the larger number of threads. Thereafter, in the following zone with the smaller number of threads, desired additives are introduced through a fill opening associated with this zone. Since the free cross-section of this zone is larger than for the preceding zone, there is sufficient space for the introduction of the additives. Consequently, they can be admixed with the material being processed without any significant back pressure. This allows such additives to be introduced in considerable amounts.

In accordance with another aspect of the invention, the enlargement of the free cross-section in the mixing zone is achieved by enlarging the housing and the respective worm elements in that zone.

In accordance with a further aspect of the invention, a fill opening is also provided for the forward zone so that both the mixing and the forward zone can be charged independently. This permits additives to be introduced, at least in part, in the forward zone containing worm elements with the larger number of threads. It is also possible that plastifiable components of the material being processed can be fed, at least in part, through the fill opening of the mixing zone with the smaller number of threads. It is therefore possible to achieve every desired combination for the infeed of additives and process material. It is of significance that there is an additional free volume available for the addition of substances to the zone with the smaller number of threads.

In accordance with still another aspect of the invention a self-cleaning characteristic is provided for both zones. Although the shaping of worm elements to achieve self-cleaning is known, the adaptation made in accordance with the invention is of particular significance. In the zone with the smaller number of threads the housing and the respective worm elements are larger than in the preceding zone. This leads to a transitional enlargement of the free cross-section from the zone with the smaller number of threads to the zone with the larger number of threads.

In accordance with a still further aspect of the invention, the introduction of significant amounts of additives does not result in subjection to substantial shear stress, because the additives are primarily introduced into the zone with the smaller number of threads through the fill opening that is provided. Because of the smaller number of threads the shear forces are less than in the preceding zone with the larger number of threads.

In accordance with yet another aspect of the invention, the machine is advantageously structured so that the zone with the larger number of threads is triple-threaded, i.e., has three different threaded segments, and the zone with the smaller number of threads is double-threaded, i.e., has two different threaded segments. Triple-threaded worm and kneading elements for the forward zone are known from German Offenlegungsschrift No. 2,550,969. The invention provides for following the forward zone or stage with double-threaded worm and corresponding kneading elements. Such a design is particularly favorable because the transition from the forward to the following stage permits an enlargement of the free cross-section that creates the required space in the second stage for the introduction of additives and leads to a filling level that is favorable for further processing.

It has been determined that the free cross-section of the zone with the smaller number of threads is desirably at least 1.5 times greater than the free cross-section of the preceding zone. Otherwise the efficiency of the machine in the second stage declines significantly.

In addition, the worm elements in successive zones desirably have respective widths of their meshing parts that are substantially alike. This provides the advantageous effect that a significantly large increase of the free cross-section can take place from the zone with the larger number of threads to the zone with the smaller number of threads, and lead to the associated advantages.

When the meshing parts of the worm profiles are provided with significantly narrow widths, ranging from about 1.5 to about 4 millimeters, depending on the diameter of the worm element, the increase in free cross-section over the preceding zone can be as high as a multiplier of 2.4. This high value is of particular significance when large quanties of additives are to be introduced.

Although it is known from German Offenlegungsschrift No. 2,614,136 that a mixing and kneading machine can have fill openings at various positions, there is no teaching in this reference relating to the axial separation, the size and shape of the worm elements, and the size of the corresponding housing which provide the desirable characteristics of the present invention.

Also known from German Auslegeschrift No. 2,513,577 is a double-shafted kneader with vanes disposed in a mixing chamber with a diameter larger than that of non-engaging conveyor and infeed worm elements, but, in contrast with the present invention, this machine is not able to produce a melt under the action of high shear forces and the enlarged free cross-section in the mixing area is not used for further infeed.

DESCRIPTION OF THE DRAWINGS

Other aspect of the invention will become apparent after considering an illustrative embodiment taken in conjunction with the drawings, in which.

DETAILED DESCRIPTION

Figure 1:
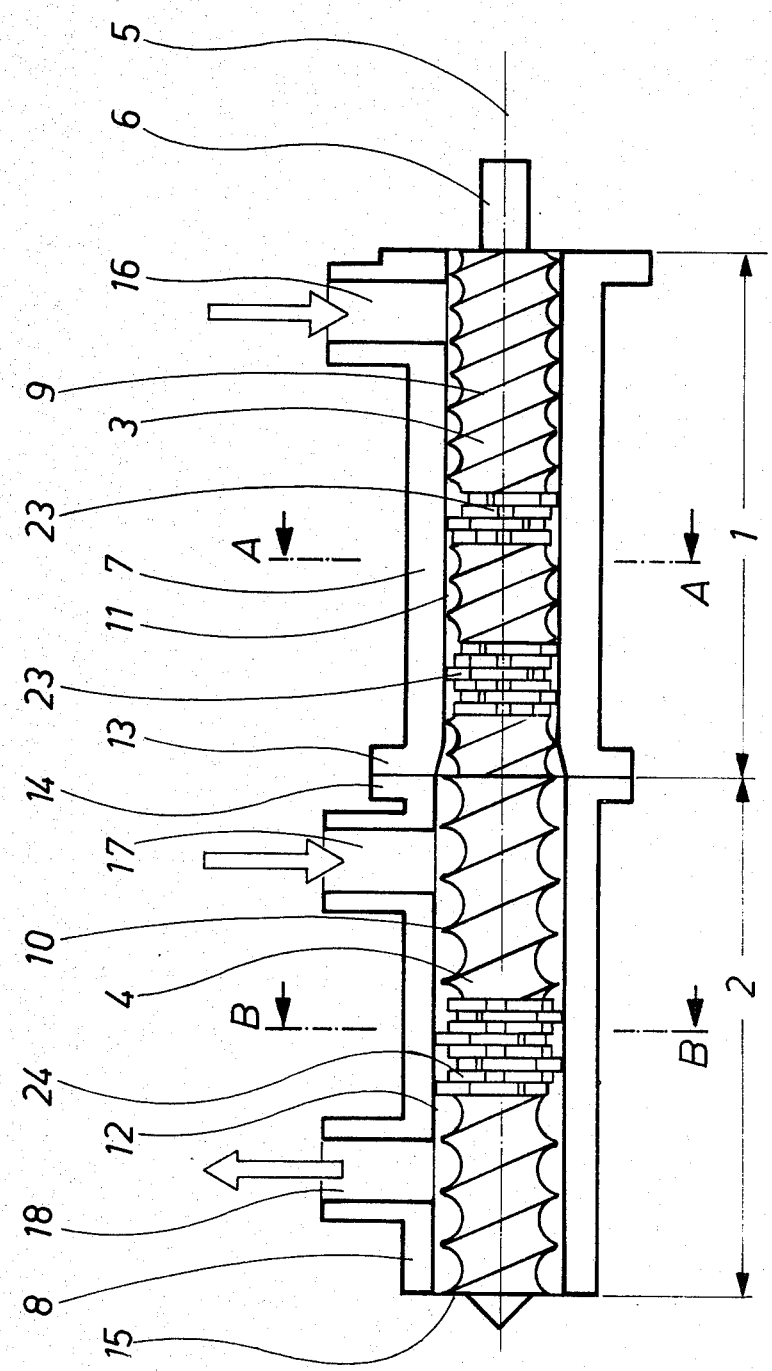
FIG. 1 is a cross-sectional view of a continuously operable mixing and kneading machine in which only one of its two parallel shafts is visible.

As shown in FIG. 1, a mixing and kneading machine in accordance with the invention includes two distinctive zones 1 and 2. Zone 1 contains three separate worm segments which form a triple-threaded worm element 3 with kneading elements 23 interspersed between the worm segments. The second zone 2 contains two worm segments forming a double-threaded worm element 4 with an intervening kneading element 24. It will be appreciated that only the worm elements 3 and 4 which face the viewer are visible in FIG. 1 and that the corresponding worm elements 3' and 4' on a parallel axis are concealed from view but are represented subsequently in the cross sectional views of FIGS. 2A and 2B.

The worm elements 3 and 4 of FIG. 1 have a common central axis indicated by a dot-dash line 5. The axial elements are solidly connected together and driven in well-known fashion from an axle stub 6.

The worm elements 3 and 4 rotate in their respective separate housings 7 and 8. As indicated in FIG. 1, the housing 8 has a larger inside diameter than the housing 7. The meshing edges 9 of the worm element 3, the meshing edges 10 of the worm element 4, and their corresponding kneading segments 23 and 24 have approximately about the same distance of separation from both the inside wall 11 of the housing 7 and the inside wall 12 of the housing 8. This distance of separation, as is well known, depends on the size of the particular worm segment and can lie about between 0.5 and about 1.5 millimeters.

The two housings 7 and 8 are solidly connected at two flanges 13 and 14. When the worm elements 3 and 4 rotate, material is advanced from zone 1 to zone 2 until it emerges from the housing 8 at an exit position 15 at the end of worm element 4. The material is then fed to an extruder nozzle (not shown). The material to be plastified is applied to the machine through a fill opening 16 near the commencement position of the worm element 3. Because of worm rotation, the material is transported towards the zone 2. During transport the triple-threadedness of the worm element and the kneading elements 23 produce significant shear forces and melt the material being plastified.

Near the commencement position of the second worm element 4 there is a further fill opening 17 to permit, primarily, the introduction of additives. In the zone 2, the additives mix with the materials being plastified, having been transported by the prior worm element 3. A significantly larger free cross-section in zone 2 is available for the infeed of the additive materials, as compared with the lesser free cross-section in the first zone 1. It is thus possible to provide for the infeed of relatively large amounts of additive for the melt generated in the first zone 1. The shear forces required for the further reduction in pressure of the material being processed are generated through a double-threaded kneading element 24 in the second zone 2. An outlet opening 18 is situated before the exit position 15 to permit outgassing in known fashion.

With the machine shown in FIG. 1 it is possible to provide for the infeed of plastifiable material through both the inlet opening 16 and the inlet opening 17. This makes different modes of mixing possible. In particular, it is possible to feed in the main portion of additives through the opening 17 and also through the inlet opening 16. Similarly it is possible to feed in plastifiable material, in supplementary fashion, through the inlet opening 17.

Figures 2A, 2B:
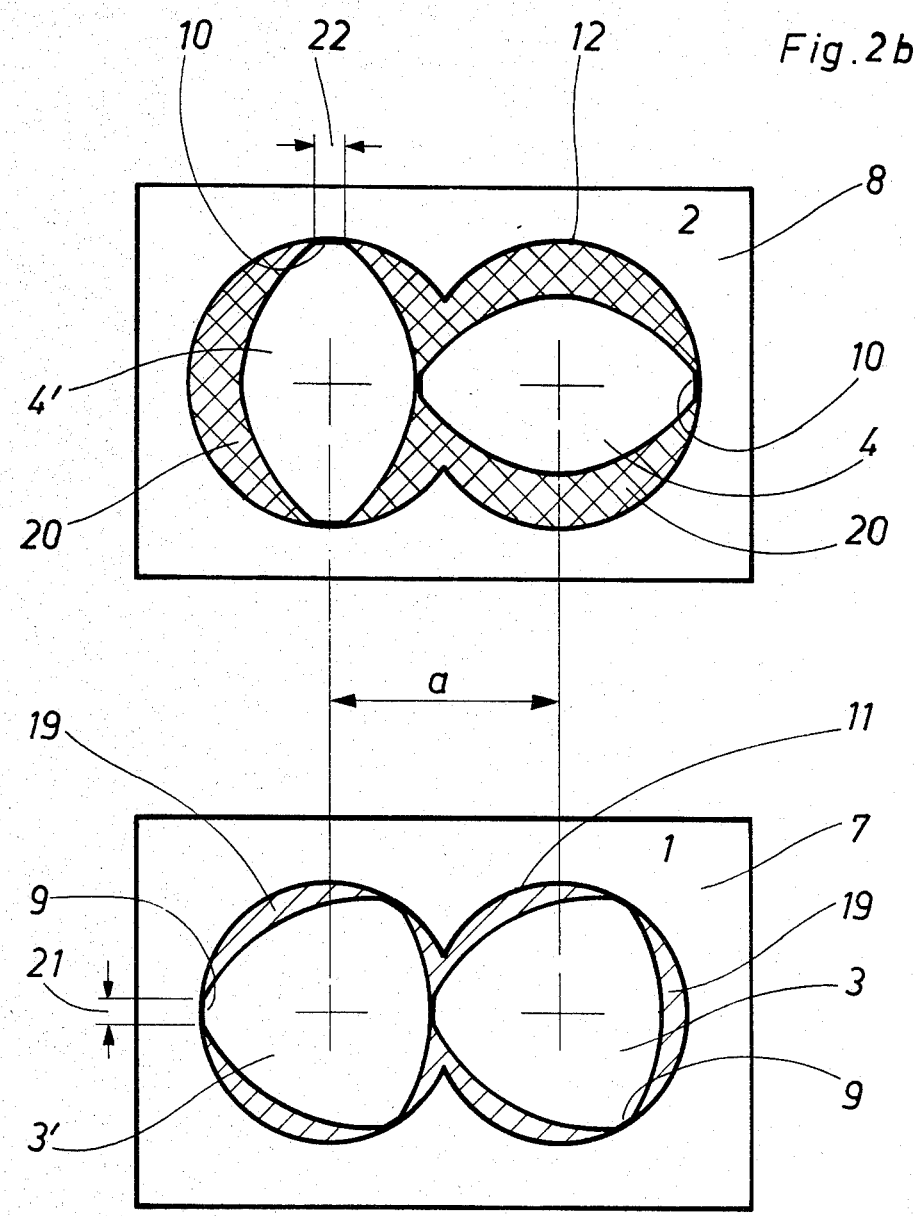
FIG. 2A is a cross-sectional view of the machine of FIG. 1 taken along the line A—A for the zone with the larger number of threads.
FIG. 2B is a cross-sectional view of the machine of FIG. 1 taken along the line B—B for the zone with the smaller number of threads.

The interior configuration of the zones 1 and 2 of FIG. 1 are shown in detail in FIGS. 2A and 2B.

FIG. 2A is a section along the line A—A of the machine in FIG. 1. FIG. 2A showns not only the section for the worm element 3 but also the corresponding worm element 3' which is not visible in FIG. 1. The worm elements 3 and 3' mesh with one another in well-known fashion and act upon one another to provide a self-cleaning operation. The worm elements 3 and 3' are accompanied by a significant free cross-sectional area 19 which is indicated by hatching. The free cross-sectional area 19 is the space between the inside wall of the housing 7 and the surface profiles of the worm elements 3 and 3'. At the end of the first zone 1, the cross-sectional area 19 is largely filled with plastified material.

Next, with reference to FIG. 2B, a section of the machine in FIG. 1 is shown along the line B—B. This section is not only of the worm element 4 but also of the corresponding worm element 4' which is not visible in FIG. 1. The worm elements 4 and 4' also intermesh in self-cleaning fashion. The free cross-section 20 between the worm elements 4 and 4' and the inside wall 12 is shown cross-hatched.

Comparing FIGS. 2A and 2B it is seen that the free cross-section 20 associated with the second zone 2 and the larger worm elements 4 and 4' is significantly larger than the cross-section 19 of the first zone 1. For the particular embodiment of FIGS. 2A and 2B the difference between the two cross-sections 20 and 19 is a factor of 2.4. In addition the worm elements 3 and 3', as well as the elements 4 and 4' have comparatively narrow widths 21 and 22 for their meshing parts 9 and 10. It is the reduced width of the meshing parts that contributes to the significant enlargement of the free cross-section 20 by a factor of 2.4. It is to be noted from FIGS. 2A and 2B that the worm segments 3 and 3', as well as the segments 4 and 4', have a constant axial separation a.

The embodiment of FIGS. 2A and 2B also shows that the considerable increase in free cross-section 20 by a factor of 2.4 is obtained when the diameter of the housing 8 is increased over the diameter of the housing 7 by a factor of only 1.13. As a result, the housing 8 does not require external enlargement in comparison with the housing 7. Thus, the present invention also achieves the surprising effect that a significant increase in free cross-section can be attained with a relatively small increase in internal housing diameter.

It will be appreciated that the materials which are plastified in accordance with the invention are ordinary plastics which soften under heat and are of the type usually processed in mixing and kneading machines. It will be appreciated that in place of such materials, liquid substances at room temperature such as unsaturated polyesters can also be used. The additives can be of varied types including, for example, glass fibers, carbon fibers, mineral fillers such as chalk, talcum, and the like. Larger quantities of dyes, for example titanium dioxide or carbon black are frequently used as additives for the production of master batches. Besides solides, one can also consider as addivites liquids such as solvents, softeners and the like.

While various aspects of the invention have been set forth by the drawings and specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. A multi-shafted continuously operating mixing and kneading machine for plastifiable compounds with intermeshing axial elements rotating in the same direction at a constant axial worm separation, each of the axial elements being equipped with different zones with different numbers of threads along their directions of advance, with a zone having a smaller number of threads following a zone with a larger number of threads, characterized as follows:
    (a) each axial element has successive zones (1,2) with worm elements (3,3'; 4,4') that engage one another so that the worm elements (3,3' or 4,4') of one zone (1 or 2) intermeshingly act upon one another in a self-cleaning fashion;
    (b) the zone (2) with the smaller number of threads has a larger interior boring of its housing (8) and larger worm elements (4,4') than the zone (1) with the larger number of threads;
    (c) the zone (2) with the smaller number of threads has a free cross-section (20) that is larger than in the preceding zone (1); and
    (d) both zones (1,2) have fill openings (16,17) which can be charged independently of one another.

2. A mixing and kneading machine according to claim 1, characterized in that the zone (1) with the larger number of threads is triple-threaded and the zone (2) with the smaller number of threads is double-threaded.

3. A mixing and kneading machine according to claim 2, characterized in that the free cross-section in the zone (2) with the smaller number of threads is about 1.5 times the free cross-section of the preceding zone (1).

4. A mixing and kneading machine according to claim 2, characterized in that the width (21,22) of the meshing parts (9,10) of the worm profiles (3,3'; 4,4') is about the same extent in successive zones (1,2).

5. A mixing and kneading machine according to claim 4, characterized in that the free cross-section (20) in the zone (2) with the smaller number of threads is about 2.4 times the free cross-section (19) of the preceding zone (1).

6. A mixing and kneading machine according to claim 2, characterized in that the free cross-section (20) in the zone (2) with the smaller number of threads is about 2.4 times the free cross-section (19) of the preceding zone (1).

7. A mixing and kneading machine according to claim 1, characterized in that the free cross-section in the zone (2) with the smaller number of threads is about 1.5 times the free cross-section of the preceding zone (1).

8. A mixing and kneading machine according to claim 1, characterized in that the zone (1) with the larger number of threads is formed by a plurality of segments which exceed the number of segments in the zone (2) with the smaller number of threads.

9. A mixing and kneading machine according to claim 8, characterized in that a kneading element (23; 24) is positioned between at least two segments of one of the zones (1 or 2).

10. A mixing and kneading machine according to claim 9, characterized in that the worm elements (3, 3'; 4, 4') abut one another at the housing transition from one zone (1) to another (2).

11. A mixing and kneading machine according to claim 9, characterized in that the kneading element (23 or 24) is formed by a plurality of discs which are eccentrically mounted on the axis of rotation (5) between zone segments of the axial elements.

12. A mixing and kneading machine according to claim 1, characterized in that the worm elements (3, 3') of one mixing zone (1) have a different cross-sectional configuration than the worm elements (4,4') of the other mixing zone (2).

13. A mixing and kneading machine according to claim 12, characterized in that the profile of the worm elements (4,4') in one zone (2) is prolate with respect to the width portions (22) of their meshing parts.

14. A mixing and kneading machine according to claim 12, characterized in that the profile of the worm elements (3,3') in one zone (1) is triangular with respect to the width portions (21) of their meshing parts.

15. The method of continuously mixing plastifiable materials which comprises the steps of:
    (a) providing mutually engaging threaded axial elements on a plurality of axes, with the elements of each axes including a plurality of different zones;
    (b) proportioning successive zones on each axis so that a zone with a smaller number of threads follows a zone with a larger number of threads and the zone with the smaller number of threads has a larger free cross section than the zone with the larger number of threads; and
    (c) operating said axial elements for the mixing of said materials.

16. The method of claim 15 further including the step of providing kneading elements among said axial elements to provide simultaneous mixing and kneading.

17. The method of claim 15 wherein the successive zones of each axis are proportioned to have different interior borings.

18. The method of claim 15 wherein the zones are charged independently of one another.

19. A continuously operable mixing machine for plastifiable materials, which comprises a plurality of threaded axial elements on each of a plurality of axes, the elements of each axis forming a plurality of different zones in which one of the zones has a larger number of threads than another and a smaller free cross section than the other; and the axial elements of each zone engaging corresponding axial elements on the same zone on an adjoining axis.

20. Apparatus as defined in claim 19 wherein the axial elements of each different zone have a different diameter bore.

* * * * *